US008730788B2

(12) United States Patent
Dao et al.

(10) Patent No.: US 8,730,788 B2
(45) Date of Patent: May 20, 2014

(54) LINEAR MULTIUSER PRECODING WITH MULTIPLE-RECEIVE ANTENNA RECEIVERS

(75) Inventors: Ngoc-Dung Dao, Bristol (GB); Fengming Cao, Bristol (GB); Yong Sun, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 520 days.

(21) Appl. No.: 13/038,878

(22) Filed: Mar. 2, 2011

(65) Prior Publication Data

US 2011/0243045 A1    Oct. 6, 2011

(30) Foreign Application Priority Data

Mar. 12, 2010    (GB) .................................. 1004165.5

(51) Int. Cl.
  *H04J 11/00*    (2006.01)
  *H04L 1/02*    (2006.01)
  *H04B 7/00*    (2006.01)
  *H04L 25/03*    (2006.01)

(52) U.S. Cl.
  CPC ............................... *H04L 25/03343* (2013.01)
  USPC .............................. 370/203; 375/267; 455/69

(58) Field of Classification Search
  None
  See application file for complete search history.

(56) References Cited

U.S. PATENT DOCUMENTS

| 2008/0075058 | A1* | 3/2008 | Mundarath et al. | 370/342 |
| 2008/0225960 | A1* | 9/2008 | Kotecha et al. | 375/259 |
| 2008/0260051 | A1 | 10/2008 | Boccardi et al. | |
| 2009/0016460 | A1* | 1/2009 | Hwang et al. | 375/267 |

FOREIGN PATENT DOCUMENTS

| EP | 1 505 741 A2 | 2/2005 |
| EP | 1 775 855 A1 | 4/2007 |
| GB | 2469081 B | 7/2012 |
| JP | 2006-244064 A | 9/2006 |

OTHER PUBLICATIONS

Taesang Yoo et al., "Optimality of Zero-Forcing Beamforming with Multiuser Diversity", IEEE, 2005.*
Search Report issued Jun. 23, 2010 in United Kingdom Patent Application No. GB1004165.5.
Office Action issued Aug. 21, 2012 in Japanese Patent Application No. 2011-055097 (with English-language translation).

(Continued)

*Primary Examiner* — Faruk Hamza
*Assistant Examiner* — Cassandra Decker
(74) *Attorney, Agent, or Firm* — Oblon, Spivak, McClelland, Maier & Neustadt, L.L.P.

(57) ABSTRACT

According to one embodiment there is provided a method performed in a transmitter side of a multiuser minimum square error linear precoding MIMO system that comprises a transmitter with a plurality of transmit antennae and a plurality of receivers. Each receiver of the plurality of receivers comprises a plurality of receive antennae. The method is a method of scheduling receivers from among the plurality of receivers and comprises obtaining, for some or all of the receivers, receiver channel information that quantifies the properties of transmit channels between receiver antennae of the receiver and transmit antennae of the transmitter and establishing an order for determining the receiver combining vectors of the some or all of the receivers. The order is established by selecting as a next receiver in the order a so far unselected receiver from the some or all of the receivers that minimally increases the mean square data transmission error. The establishing of the order is based on the channel information of any receivers previously selected in the order and of unselected receivers.

15 Claims, 6 Drawing Sheets

(56) References Cited

OTHER PUBLICATIONS

Jin-Sung Kim, et al., "Linear Beamforming for Multiuser MIMO Downlink Systems with Channel Orthogonalization", GLOBECOM 2009-2009 IEEE Global Telecommunications Conference, Nov. 30-Dec. 4, 2009, 6 pages.

Chan-Byoung Chae, et al., "Coordinated Beamforming for Multiuser MIMO Systems with Limited Feedforward", Fortieth Asilomar Conference on Signals, Systems and Computers, Oct. 29-Nov. 1, 2006, pp. 1511-1515.

Michael Joham, et al., "Linear Transmit Processing in MIMO Communications Systems", IEEE Transactions on Signal Processing, vol. 53, No. 8, Aug. 2005, pp. 2700-2712.

Taesang Yoo, et al., "On the Optimality of Multiantenna Broadcast Scheduling Using Zero-Forcing Beamforming", IEEE Journal on Selected Areas in Communications, vol. 24, No. 3, Mar. 2006, pp. 528-541.

Masoud Sharif, et al., "On the Capacity of MIMO Broadcast Channels With Partial Side Information", IEEE Transactions on Information Theory, vol. 51, No. 2, Feb. 2005, pp. 506-522.

Chan-Byoung Chae, et al., "Coordinated Beamforming for the Multiuser MIMO Broadcast Channel With Limited Feedforward", IEEE Transactions on Signal Processing, vol. 56, No. 12, Dec. 2008, pp. 6044-6056.

Christian B. Peel, et al., "A Vector-Perturbation Technique for Near-Capacity Multiantenna Multiuser Communication—Part I: Channel Inversion and Regularization", IEEE Transactions on Communications, vol. 53, No. 1, Jan. 2005, pp. 195-202.

Ali M. Khachan, et al., "Linear Processing for the Downlink in Multiuser MIMO Systems with Multiple Data Streams", IEEE International Conference on Communications, vol. 9, 2006, pp. 4113-4118.

Semih Serbetli, et al., "Transceiver Optimization for Multiuser MIMO Systems", IEEE Transactions on Signal Processing, vol. 52, No. 1, Jan. 2004, pp. 214-226.

Shreeram Sigdel, et al., "Simplified Fair Scheduling and Antenna Selection Algorithms for Multiuser MIMO Orthogonal Space-Division Multiplexing Downlink", IEEE Transactions on Vehicular Technology, vol. 58, No. 3, Mar. 2009, pp. 1329-1344.

\* cited by examiner

LINEAR MULTIUSER PRECODING WITH MULTIPLE-RECEIVE ANTENNA RECEIVERS

CROSS-REFERENCE TO RELATED APPLICATION(S)

This application is based upon and claims the benefit of priority from United Kingdom patent application No. 1004165.5, filed on 12 Mar. 2010; the entire contents of which are incorporated herein by reference.

FIELD

Embodiments described herein relate generally to multiple-in multiple-out (MIMO) linear multiuser precoding for receivers having multiple receive antennae. Embodiments described herein moreover relate generally to creating a schedule for jointly designing receive combining vectors for the receivers in the MIMO system.

BACKGROUND

FIG. 1 shows a wireless communication system comprising a base station with M transmit antennae in communicative contact with K users/receivers. Each of the K receivers has $N_k$ (k=1, 2, ..., K) receiver antennae. The base station sends K data streams simultaneously to K receivers such that each receiver receives one data stream. At the transmitter side, the signal vector s is precoded by a precoder P to produce a transmitted vector x. A linear receive combiner for combining the signals received through multiple receive antennae is provided in each receiver to improve reception quality. Following receiver combination the combined signal is input into a data detector.

The system shown in FIG. 1 can be mathematically described in the following form. Let $H_k$ (of size $N_k \times M$) and $c_k$ (of size $1 \times N_k$) be the channel matrix and receiver combining vector of receiver k. The effective channel of receiver k as seen by the base station is:

$$\hat{h}_k = c_k H_k \quad (1)$$

To keep the noise power unchanged, the norm of the combining vectors are all 1, i.e. $\|c_k\|=1$.

The effective channel matrix is:

$$\hat{H} = \begin{bmatrix} \hat{h}_1 \\ \vdots \\ \hat{h}_K \end{bmatrix} \quad (2)$$

If base station employs linear minimum mean square error (MMSE) precoding, then the precoding matrix P can be expressed as:

$$P = \beta \left( \hat{H}^H \hat{H} + \frac{K}{E_{tr}} I_M \right)^{-1} \hat{H}^H \quad (3)$$

where $E_{tr}$ is the total transmit power, $I_M$ is an M×M identity matrix and the superscript H denotes a matrix transpose conjugate operation. $\beta$ is a power normalisation factor given by:

$$\beta = \sqrt{\frac{E_{tr}}{tr(F^{-2} \hat{H}^H \hat{H})}} \quad (4)$$

where:

$$F = \hat{H}^H \hat{H} + \frac{K}{E_{tr}} I_M \quad (5)$$

Let $y_{i,k}$ be the received signal at antenna i of receiver k. The combined receive signal of receiver k follows:

$$z_k = c_k [y_{1,k} y_{2,k} \ldots y_{N_k,k}]^T \quad (6)$$

The linear zero-forcing (ZF) precoder proposed in the above mentioned Joham et al and the Peel et al papers can be obtained by removing the term $$\frac{K}{E_{tr}} I_M$$

in equations (3) and (5).

It is desirable to design linear receiver combining vectors $c_k$ for a given set of receivers such that the total distortion, measured by the sum of mean square error (MSE) of all receivers, is minimized. Solutions to this problem are known.

In some known methods the combining vectors are selected by taking the left singular vector corresponding to the dominant singular value of receivers' channel matrices. This method may suffer from significant performance loss since the combining vectors of receivers are not jointly designed.

Another method of exploiting the diversity of multiple receive antennas is antenna selection.

BRIEF DESCRIPTION OF THE DRAWINGS

Embodiments will now be described by way of example only and with reference to the accompanying drawings, in which.

DETAILED DESCRIPTION

Figure 1:
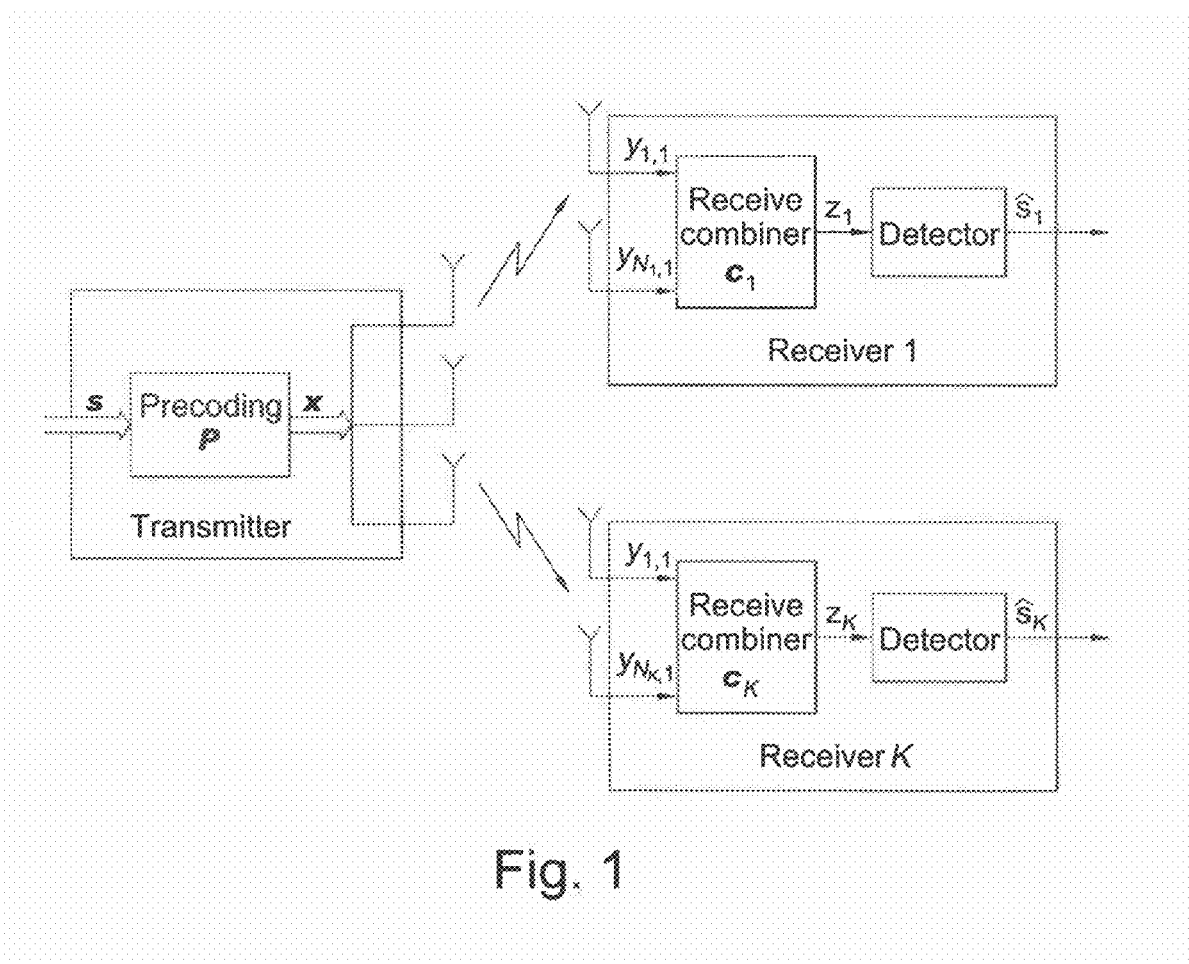
FIG. 1 shows a system model of multiuser linear precoding with multi-antenna receivers.

According to one embodiment there is provided a method performed in a transmitter side of a multiuser minimum square error linear precoding MIMO system that comprises a transmitter with a plurality of transmit antennae and a plurality of receivers. Each receiver of the plurality of receivers comprises a plurality of receive antennae. The method is a method of scheduling receivers from among the plurality of receivers and comprises obtaining, for some or all of the receivers, receiver channel information that quantifies the properties of transmit channels between receiver antennae of the receiver and transmit antennae of the transmitter and establishing an order for determining the receiver combining vectors of the some or all of the receivers. The order is established by selecting as a next receiver in the order a so far unselected receiver from the some or all of the receivers that minimally increases the mean square data transmission error. The establishing of the order is based on the channel information of any receivers previously selected in the order and of unselected receivers.

Multiuser precoding is an efficient approach to reach the capacity of multiuser spatial multiplexing of downlink channels. When receivers have multiple receive antennas, the signals of multiple receive antennas can be combined to improve the reception quality. Furthermore, if base station knows the channel matrices of all receivers, the receiver combining vectors of all receivers can be jointly designed to optimize the system-wide performance.

The number of receivers attempting to participate in data transmission with the transmitter can be lower or equal to the number of data streams that the transmitter is able to support. In this case the method can determine the order in which the receiver combining vectors of the receivers are to be determined. If, however, the number of receivers attempting to participate in data transmission with the transmitter is higher than the number of data streams the transmitter is able to support, then the method may only select up to a number of receivers for data communication that corresponds to the maximum number of data streams that the transmitter can support. In both cases the order in which the receiver combining vectors are to be determined to minimise the means square data transmission error is established. In the latter case those receivers that would contribute most to the mean square error may also be automatically excluded from data communication with the transmitter.

A receiver combining vector for a receiver may be calculated after the receiver has been selected as the next receiver in the order and before the next receiver in the order is selected. In this case the determined receiver combining vector can be used in subsequent steps when other receivers are selected as part of the order and/or when the receiver combining vectors for such other receivers are determined.

Alternatively a number of receivers are placed in the order before receiver combining vectors that are to be used in the number of receivers are determined. The order in which all of the receiver combining vectors of selected receivers/of all receivers that can be supported by the transmitter are determined may, for example, be determined before any of the receiver combining vectors that are to be used in the receivers for data transmission are determined.

The above two alternatives are equally viable and may have individual advantages and disadvantages. It may, for example be necessary for the receiver combining vector of a receiver to be known before the next receiver in the order can be determined. In the first alternative, this is not a problem as the receiver combining vectors are determined before a next receiver is allocated its place in the order. If, however, a number or all of the receivers are placed in the order, then approximate receiver combining vectors may need to be used to complete the ordering process before the actual receiver combining vectors that are to be used in the receivers can be determined. It is, for example possible, prior to determining said order, to determine for each receiver a preliminary receiver combining vector $c_{kp}$ that fulfils $$c_{kp} = \max_{|\hat{c}_k|=1} \|\hat{c}_k H_k\|^2,$$

wherein $\hat{c}_k$ corresponds to a plurality of possible receiver combining vectors. The receiver that fulfils this requirement can be identified using singular value decomposition, hereinafter referred to as SVD, of the term in the norm. The preliminary receiver combining vector may be the left singular vector corresponding to the maximum singular value determined in the SVD. Alternatively, the preliminary receiver combining vectors can be determined using eigenvalue decomposition, hereinafter referred to as EVD, in a manner discussed in more detail below.

Having obtained such a preliminary receiver combing vectors, the receivers can, despite the fact that they comprise more than one antenna, be treated as if they were a single antenna receivers. The actual receiver combining vectors that are to be used in the receivers, can be determined once the order in which this task is to be completed has been established. A next, n-th receiver in the order can be selected such that, when the n-th receiver is operated using its associated preliminary receiver combining vector $c_{np}$, the n-th receiver minimally contributes to the means square data transmission error.

The next, n-th receiver in the order can be a receiver fulfilling:

$$\operatorname*{argmax}_{k \in \Delta}(1 + g_{kn}(c_{kp}H_k)^H)^{-1}\|g_{kn}\|^2$$

wherein k is an index of unselected receivers in a set $\Delta$, $H_k$ is the channel matrix of receiver k and comprises the said channel information, superscript H denotes a matrix transpose conjugate operation, $\|g_{kn}\|$ is the norm of the matrix $g_{kn}$, and $g_{kn}$ is useable for determining the n-th receiver, wherein:

$$g_{kn} = c_{kp}H_k A_n^{-1}, \forall k \in \Delta$$

wherein $A_n^{-1}$ is a matrix useable for determining the n-th receiver and including matrices $A_{n-1}^{-1}$ and $g_{k_{n-1}}$ that had been used for the selection of the preceding, (n−1)-th receiver, wherein:

$$A_n^{-1} = A_{n-1}^{-1} - g_{k_{n-1}}^H(1 + g_{k_{n-1}}(c_{k_{n-1}p}H_{k_{n-1}})^H)^{-1}g_{k_{n-1}}$$

Returning to a way of selecting receivers for the order in which, once a receiver has been identified as the next receiver in the order, the receiver combining vector is determined before the next, n-th receiver is found for the order, and to the way in which a next, n-th receiver in the order is found, the remaining unselected receivers can be considered as constituting a set $\Delta$ of unselected receivers with indices k. The next, n-th receiver from may be required to have a receiver combining vector $\hat{c}_k$ that fulfils:

$$\arg\max_{k \in \Delta, \|\hat{c}_k\|=1} \frac{\hat{c}_k H_k A^{-2} H_k^H \hat{c}_k^H}{\hat{c}_k(I_{N_k} + H_k A^{-1} H_k^H)\hat{c}_k^H}.$$

wherein $H_k$ is the channel matrix of receiver k comprising the said channel information and superscript H denotes a matrix transpose conjugate operation, $I_{N_k}$ is a $N_k \times N_k$ identity matrix, wherein $N_k$ is the number of receiver antennae of each receiver, wherein:

$$A_n^{-1} = A_{n-1}^{-1} - g_{n-1}^H (1 + g_{n-1}(c_{k_{n-1}} H_{k_{n-1}})^H)^{-1} g_{n-1}$$

wherein $A_n^{-1}$ is the matrix $A^{-1}$ for the selection of a current, n-th receiver in the order, $A_{n-1}^{-1}$ the matrix $A^{-1}$ that has been used for the selection of the preceding, (n−1)-th, receiver in the order, $c_{k_{n-1}}$ is the receiver combining vector of the (n−1)-th receiver and $H_{k_{n-1}}$ is the channel matrix of the (n−1)-th receiver, with $A_1^{-1} = \alpha^{-1} I_M$, wherein M is the number of transmitter antennae of the transmitter, $\alpha = K/E_{tr}$, wherein K is the number of data streams between the transmitter and the receivers and $E_{tr}$ is the total transmitter power; and $$g_{n-1} = c_{k_{n-1}} H_{k_{n-1}} A_{n-1}^{-1}$$

It will be appreciated that, for the selection of the first receiver in the order $A_1^{-1} = \alpha^{-1} I_M$, as above stated and that this matrix $A_1^{-1}$ becomes the matrix $A_{n-1}^{-1}$ for the selection of the second receiver to the order and that the matrices $A_n^{-1}$, $c_{k_{n-1}} H_{k_{n-1}}$, and $g_{n-1}$ are updated to refer to those matrices used as current matrices in the immediately preceding selection step.

The next receiver in the order may be identified by performing an EVD of the matrix $O_k = (I_{N_k} + H_k A^{-1} H_k^H)^{-1} H_k A^{-2} H_k^H$ for some or all receivers k from among the set Δ of unselected receivers. The next receiver selected for the order is the receiver for which the maximum eigenvalue of the matrix $O_k$ is the largest. The receiver combining vector that is to be used with this receiver is the eigenvector of the matrix $O_k$ of the selected receiver that is associated with the largest eigenvalue of the matrix $O_k$.

The next receiver in the order may alternatively be identified by performing a singular value decomposition of the matrix $O_k = (I_{N_k} + H_k A^{-1} H_k^H)^{-1} H_k A^{-2} H_k^H$, for some or all receivers k from among the set Δ of unselected receivers. The next, n-th receiver in the order is then the receiver for which the maximal singular value of the matrix $O_k$ is the largest. The receiver combining vector that is to be used with this receiver is the singular vector corresponding to the largest singular value of the matrix $O_k$ of the selected receiver.

Irrespective of whether EVD or SVD are used, the present methods all allow the determining of a schedule for calculating receiver combining vectors that eliminate the need for iterative optimization of transmitter precoder and receiver combiners, and associated determination steps.

In both of the above (EVD and SVD) ways of receiver selection the steps of selecting the next receiver in the order also yields the final receiver combining vector for the selected receiver. To select a single receiver, the number of EVDs/SVDs that need to be performed corresponds to the number of remaining unselected receivers. The inverse of the matrix $(I_{N_k} + H_k A^{-1} H_k^H)$ that forms part of the matrix $O_k$ may be calculated by calculating $I_{N_k} - I_{N_k} H_k (A + H_k^H H_k)^{-1} H_k$. The inverse of the matrix $(A + H_k^H H_k)$ required in the latter term may in turn be calculated by matrix update.

The process of calculating the EVD of the matrix $O_k$ may alternatively be put to a different use. It is discussed above that the order of the receivers can be determined first before the final receiver combining vectors that are to be used by the receivers are determined. This manner of determining the receiver order, however, relies on the determination of preliminary receiver combining vectors, which (as discussed above) permit treating of the receivers as if they had only a single receive antennae. In the above discussion an SVD based method of determining these preliminary receiver combining vectors is discussed. An alternative manner in which the preliminary receiver combining vectors can be determined may comprise calculating the largest eigenvalue of the matrix $O_k$ for each receiver and the associated eigenvector and using the so determined eigenvector as the preliminary receiver combining vector. In this case, $A^{-1} = \alpha^{-1} I_M$ for all receivers, as the above discussed matrix updates for the matrix $A^{-1}$ cannot be completed in the absence of knowledge of the order in which the receiver combining vectors should be determined to minimise the mean square error. The receiver combining vectors determined in this instance are, however, preliminary and that the correct receiver combining vectors that are to be used in the receivers will in any case be determined later, as discussed above.

The method may further comprise providing a codebook of possible receiver combining vectors and selecting from among a plurality of possible combinations of receivers with receiver combining vectors from the codebook the combination that increases the mean square data transmission error the least. The receiver combining vectors may thus be limited to a number of receiver combining vectors that are known at the transmitter before receiver channel data is taken into account. The codebook of the transmitter may also be known/stored at the receiver, so that, once a receiver combining vector has been selected as the most suitable for the receiver, it is not necessary for the receiver combining vector to be transmitted to the receiver. Instead, the selected receiver combining vector could simply be identified to the receiver. If the codebook is a matrix, this could, for example, be done by identifying the row or column of the matrix that comprises the selected receiver combining vector by its index.

The codebook can be a codebook matrix C. For each receiver with index k within a set Δ of unselected receivers, the codebook C can be multiplied with a channel matrix $H_k$ of the receiver. The channel matrix $H_k$ comprises the channel information and a matrix $\overline{H}_k = CH_k$ is thus formed. The method may further comprise determining the index k of the n-th receiver in the order and the row index j within the matrix $\overline{H}_k$ that fulfil:

$$\arg\max_{k \in \Delta, j=1,\ldots,R} \frac{\overline{H}_k(j,:) A_n^{-2} \overline{H}_k(j,:)^H}{\overline{H}_k(j,:) A_n^{-1} \overline{H}_k(j,:)^H}$$

wherein R is the number of receiver combining vectors in the codebook matrix C and wherein H denotes a matrix transpose conjugate operation, wherein the matrix $A_n^{-1}$ for the selection of the n-th receiver is:

$$A_n^{-1} = A_{n-1}^{-1} - g_{n-1}^H (1 + g_{n-1} \hat{h}_{\overline{k}_{n-1}}^H)^{-1} g_{n-1}$$

wherein $g_{n-1} = \hat{h}_{\overline{k}_{n-1}} A_{n-1}^{-1}$ and $\hat{h}_{\overline{k}_{n-1}} = \overline{H}_{\overline{k}_{n-1}}(j_{n-1},:)$, wherein $\overline{H}_{\overline{k}_{n-1}}$ is the matrix $\overline{H}_k$ of the (n−1)-th receiver immediately preceding the n-th receiver in the order and $j_{n-1}$ the selected row index within this matrix $\overline{H}_{\overline{k}_{n-1}}$.

The codebook may comprise fixed possible receiver combining vectors that remain the same for each of the receivers for which the codebook is used. It is, however, not necessary that the same codebook is used for all of the receivers. Instead different codebooks, each individually comprising its own fixed possible receiver combining vectors, can be used for different receivers. Each receiver may, for example, be assigned an individual codebook, wherein the assigned codebooks for the receiver differ.

The codebook may also comprise a possible receiver combining vector that can be adapted to the particular receiver for which the codebook is to be used. This adaptive possible receiver combining vector may be the left singular vector corresponding to the dominant singular value determined by a singular value decomposition of a channel matrix comprising the said receiver's channel information. The adaptive possible receiver combining vector may only form part of the codebook and be present alongside the above mentioned fixed possible receiver combining vectors. It will be appreciated that, if the codebook comprises an adaptive possible receiver combining vector, different codebooks will be used for different receivers.

If it is determined in the transmitter that the adaptive/adapted possible receiver combining vector is the most optimal receiver combining vector, then the receivers are required to perform a singular value decomposition to determine the receiver combining vector. The above codebook based selection method optimises the selection of combining vectors from a codebook based on the mean square error criterion using either greedy or pre-deterministic search for the best combining vector.

The method of the embodiment is of course not limited to simply determining the order in which the receive combining vectors of selected/ordered receivers are to be determined by may also include the determining of the receiver combining vectors for the receivers in the order. The receiver combining vectors may be determined so that the mean square error achieved by the previously selected receivers is only minimally increased by the next receiver in the order, for which the receiver combining vector is being determined. Determining the receiver combining vectors may be based on the channel information and on previously determined receiver combining vectors. The method may further comprise transmitting the receiver combining vectors to the receivers in which they are to be used, transmitting data from the transmitter to the receivers and combining data signals received by the plurality of receive antennae of a receivers using the receive combining vector in the receivers.

Transmitters may comprise means, for example software or hardware means, for computing an SVD of a matrix. These means may be used in their normal use for a purpose different from calculating any of the above mentioned SVD. Such SVD means can, however, routinely be idle and may be used during idle periods to calculate any or all of the above SVDs required for receiver ordering and/or determination of the receiver combining vectors.

According to another embodiment there is provided a method performed in a transmitter side of a multi-user minimum square error linear precoding MIMO system that comprises a transmitter with a plurality of transmit antennae and a plurality of receivers. Each receiver of the plurality of receivers comprises a plurality of receive antennae. The method is a method of scheduling receivers from among the plurality of receivers and comprises obtaining, for some or all of the receivers, receiver channel information quantifying the properties of transmit channels between receiver antennae of the receiver and transmit antennae of the transmitter and establishing an order for determining the receiver combining vectors of the some or all of the receivers by selecting as a next receiver in the order a so far unselected receiver from the some or all of the receivers that minimally increases the mean square data transmission error, based on the channel information of any receivers previously selected in the order and of unselected receivers. The method further comprises determining receive combining vectors for the receivers in the order so as to minimise the mean square error of previously selected receivers. The determining is based on the channel information and takes into account receivers for which receive combining vectors have already been determined.

The above described methods can also comprise transmitting data from the transmitter to the receivers and combining data signals received by the plurality of receive antennae of a receiver using the receive combining vector of the receiver.

According to another embodiment there is provided an apparatus for scheduling receivers from among a plurality of receivers in a multiuser minimum square error linear precoding MIMO system that comprises a transmitter with a plurality of transmit antennae. Each receiver of the plurality of receivers comprises a plurality of receive antennae. The apparatus comprises a channel estimator arranged to obtain, for some or all of the receivers, receiver channel information quantifying the properties of transmit channels between receiver antennae of the receiver and transmit antennae of the transmitter and a scheduler that is arranged to establish an order for determining the receiver combining vectors of the some or all of the receivers by selecting as a next receiver in the order a so far unselected receiver from the some or all of the receivers that minimally increases the mean square data transmission error, based on the channel information.

According to another embodiment there is provided a multiuser minimum square error linear precoding MIMO system comprising an apparatus for scheduling receivers from among a plurality of receivers in the MIMO system, the MIMO system further comprising a transmitter with a plurality of transmit antennae, wherein each receiver of the plurality of receivers comprises a plurality of receive antennae. The apparatus comprises a channel estimator arranged to obtain, for some or all of the receivers, receiver channel information quantifying the properties of transmit channels between receiver antennae of the receiver and transmit antennae of the transmitter and a scheduler that is arranged to establish an order for determining the receiver combining vectors of the some or all of the receivers by selecting as a next receiver in the order a so far unselected receiver from the some or all of the receivers that minimally increases the mean square data transmission error, based on the channel information. The apparatus moreover includes a processor arranged to determine receiver combining vectors for said receivers in the said order in a manner that minimises the mean square error of previously selected receivers. The processor is arranged to base making the determination on the channel information and taking into account receivers for which receiver combining vectors have already been determined. The MIMO system further comprises a transmitter for transmitting data from the transmitter to the receivers. Wherein the receivers individually comprise combiners that are arranged to combine data signals received by the plurality of receive antennae of a receiver using the receiver combining vector determined by the processor.

The transmitter side of the MIMO system may be a base station, a mobile base station.

In the following a step-by-step general solution to the problem of designing linear receiver combining vectors $c_k$ for a given set of receivers, such that the total distortion, measured by the sum of mean square error (MSE) of all receivers, is minimized, is discussed in the section entitled "General Solution". Following the general discussion two algorithms for reducing the complexity of, and consequently the computational expense associated with, the general algorithm are discussed in the sections entitled "Low-Complexity Matrix Inversion" and "Fast User Ordering". Alternatives for simplifying the discussed algorithms are then presented in the section entitled "Alternative Implementations" and the use of code books of receiver combining vectors is explored in the section entitled "Codebook-Based Receiver Combining Vectors".

General Solution

The design criterion used in this solution is to minimize the mean square error (MSE) of the precoder. The MSE can be expressed in the following form:

$$\psi = \text{tr}\left(\frac{E_{tr}}{K}\hat{H}\hat{H}^H + I_K\right)^{-1} \quad (7)$$

wherein $I_K$ is a K×K identity matrix.

An alternative form of the MSE can be derived in the following manner. Let α be defined as $\alpha = K/E_{tr}$ and $\hat{H} = UDV^H$ be a singular value decomposition, wherein U and V are unitary matrices and D is a diagonal matrix. It follows that:

$$\begin{aligned}\psi &= \text{tr}(\alpha^{-1}\hat{H}\hat{H}^H + I_K)^{-1} \\ &= \text{tr}(\alpha^{-1}UDD^H U^H + I_k)^{-1} \\ &= \text{tr}[U(\alpha^{-1}DD^H + I_k)^{-1}U^H] \\ &= \sum_{i=1}^{K}\frac{1}{\alpha^{-1}d_i^2 + 1}\end{aligned} \quad (8)$$

wherein $d_i$ is the i-th element of the diagonal matrix D. (The cyclic property of the trace operation, tr(ABC)=tr(CAB), is used to obtain the fourth line of equation (8) above.)

To compute MSE a matrix inversion operation needs to be performed repeatedly. However, the computational complexity associated with such an operation is prohibitively high. This problem can be avoided by considering another quantity φ defined as:

$$\begin{aligned}\varphi &= \text{tr}(\alpha^{-1}\hat{H}^H\hat{H} + I_M)^{-1} \\ &= \text{tr}(\alpha^{-1}VD^H DV^H + I_M)^{-1} \\ &= \text{tr}[V(\alpha^{-1}D^H D + I_M)^{-1}V^H] \\ &= M - K + \sum_{i=1}^{K}\frac{1}{\alpha^{-1}d_i^2 + 1} \\ &= M - K + \psi.\end{aligned} \quad (9)$$

Minimizing the MSE ψ of the linear MMSE precoder is consequently equivalent to minimizing the quantity φ. The objective of designing linear receiver combining vectors $c_k$ for a given set of receivers such that the total distortion, measured as the sum of mean square error (MSE) of all receivers, is minimized can be mathematical stated as:

$$\{c_1, c_2, \ldots, c_K\} = \arg\min_{\hat{c}_1, \hat{c}_2, \ldots, \hat{c}_K} \text{tr}(\hat{H}^H\hat{H} + \alpha I_M)^{-1} \quad (10)$$

subject to $$\|\hat{c}_k\| = 1 \forall k = 1, 2, \ldots, K.$$

It is not believed that the global solution of equation (10) is tractable. In the following a low-complexity near-optimal approach to compute the combining vectors of receivers based on equation (10) is, however, provided. The algorithm disclosed as part of approach proceeds in a step-wise fashion and identifies from among all of the thus far unselected receivers participating in the selection process, in each step, the unselected receiver that minimally increases the MSE of the precoder. In other words, in each step of the selection process one thus far unselected receiver is selected so that the distortion experienced by the already selected receivers and by the newly selected receiver increases by the minimally possible amount.

The algorithm makes use of the matrix inversion lemma, which states that for a n×n positive definite matrix A and a n×1 vector a:

$$(A + aa^H)^{-1} = A^{-1} - A^{-1}a(1 + a^H A^{-1}a)^{-1}a^H A^{-1} \quad (11)$$

Let $\Omega = \{\bar{k}_1, \bar{k}_2, \ldots, \bar{k}_{n-1}\}$ be the set of indices of n−1 already selected receivers, whose combining vectors have been computed. Let $\bar{H}_\Omega$ be the channel matrix containing the effective channels of these receivers:

$$\bar{H}_\Omega = \begin{bmatrix}\hat{h}_1 \\ \hat{h}_2 \\ \vdots \\ \hat{h}_{n-1}\end{bmatrix} = \begin{bmatrix}c_1 H_1 \\ c_2 H_2 \\ \vdots \\ c_{n-1} H_{n-1}\end{bmatrix} \quad (12)$$

Let A be $A = \bar{H}_\Omega^H \bar{H}_\Omega + \alpha I_M$. Let Δ be a set of thus far unselected receivers, whose combining vectors are to be computed. Let $$a^H = \hat{h}_k = c_k H_k \quad (13)$$

where k∈Δ. Since A is positive definitive, $A^{-1}$ is also positive definitive. Equation (11) can be re-written to read:

$$(\bar{H}_\Omega^H \bar{H}_\Omega + \hat{h}_k^H \hat{h}_k + \alpha I_M)^{-1} = A^{-1} - A^{-1}\hat{h}_k^H(1 + \hat{h}_k A^{-1}\hat{h}_k^H)^{-1}\hat{h}_k A^{-1} \quad (14)$$

Using $g_k = \hat{h}_k A^{-1}$, equation (14) can be simplified to read:

$$(\bar{H}_\Omega^H \bar{H}_\Omega + \hat{h}_k^H \hat{h}_k + \alpha I_M)^{-1} = A^{-1} - g_k^H(1 + g_k \hat{h}_k^H)^{-1} g_k = A^{-1} - (1 + g_k \hat{h}_k^H)^{-1} \|g_k\|^2 \quad (15)$$

The left hand side of equation (15) corresponds to the matrix term of equation (10) that is to be inverted, taking into account all of the previously selected receivers of the set $\Omega = \{\bar{k}_1, \bar{k}_2, \ldots, \bar{k}_{n-1}\}$ and an additional receiver $k_n$. The right hand side of equation (15) can be as a substitute for the matrix term of equation (10) that is required to be inverted, so that those receivers that minimally increase MSE can be found using equation (10) without requiring the matrix inversion on the left hand side of equation (15). Equation (15) also makes it clear that equation (10) can be applied in an iterative fashion.

Using the matrix inversion lemma of equation (11) together with equation (13), equation (10) can be re-written to show that the combining vector of the next receiver $\bar{k}_n$ satisfies:

$$\begin{aligned}\{\bar{k}_n, c_{\bar{k}_n}\} &= \arg\min_{k \in \Delta, \|\hat{c}_k\|=1} \text{tr}\left[A^{-1} - \frac{A^{-1}\hat{c}_k^H H_k^H H_k \hat{c}_k A^{-1}}{1 + \hat{c}_k H_k A^{-1} H_k^H \hat{c}_k^H}\right] \\ &= \arg\min_{k \in \Delta, \|\hat{c}_k\|=1} \frac{\hat{c}_k H_k A^{-2} H_k^H \hat{c}_k^H}{\hat{c}_k(I_{N_k} + H_k A^{-1} H_k^H)\hat{c}_k^H}.\end{aligned} \quad (16)$$

wherein $I_{N_k}$ is a $N_k \times N_k$ identity matrix.

Equation (16) forms the basis for two consecutive operations. In a first operation the combining vectors $c_k$ of all remaining receivers of the set Δ are computed. Then the receiver that minimally contributes to the increment of MSE will be selected.

The solution of equation (16) is known in the theory of matrix analysis. For a receiver i∈Δ, the best combining vector is the eigenvector corresponding to the largest eigenvalue of the generalized eigenvalue decomposition (EVD). Let $$X_k = H_k A^{-2} H_k^H \quad (17)$$

$$Y_k = I_{N_k} + H_k A^{-1} H_k^H \quad (18)$$

using an eigenvalue decomposition of $Y_k^{-1} X_k$ as $Y_k^{-1} X_k = E_k D_k E_k^{-1}$, where $D_k$ is a diagonal matrix comprising the eigenvalues, $D_k = \text{diag}(d_{k,1}, d_{k,2}, \ldots, d_{k,N_k})$, wherein $N_k$ is the number of unselected receivers, and wherein $E_k$ is a square matrix comprising the eigenvectors. If $d_{k,j}$ is the largest eigenvalue of matrix $Y^{-1}X$, the best combining vector of receiver i is:

$$c_k = E_k(:,j)^H \quad (19)$$

Additionally, when the combining vector is the one in equation (19), the corresponding eigenvalue can be calculated according to:

$$\frac{c_k H_k A^{-2} H_k^H c_k^H}{c_k (I_{N_k} + H_k A^{-1} H_k^H) c_k^H} = d_{k,j} \quad (20)$$

Equation (20) is used to quickly compute the right hand side of equation (16), which is the selection criterion for the next user.

The general solution of the optimal combining vector for a receiver k is given in equation (19).

Once all maximum eigenvalue of each of the unselected receivers of set Δ have been determined, they can be compared to each other. The largest eigenvalue out of the maximum eigenvalues that have been determined for the uses identifies the receiver out of the unselected receivers of the set Δ that will introduce the least distortion, as measured by the sum of mean square error (MSE). The receiver with the maximal value of $d_{k,j}$ will be selected to compute the combining vector using equation (19).

When selecting the first receiver, no channel matrices of previously selected receivers can be taken into account, so that $A = \alpha I_M$.

The above described process can be expressed in pseudo code in the manner shown in Table 1.

The EVD in line 5 of the above N-I algorithm can be computed by the Power method (as described, for example, in G. Golub and C. Van Loan, Matrix Computations, 3rd ed. Baltimore, Md.: The Johns Hopkins University Press, 1996, the entirety of which is incorporated herein by this reference). The above N-I algorithm is nevertheless complex. The complexity of the N-I algorithm is largely determined by requiring multiple matrix inversion $(I_{N_k} + H_k A^{-1} H_k^H)^{-1}$ in step 4 and multiple eigenvalue decompositions in step 5.

Figure 2:
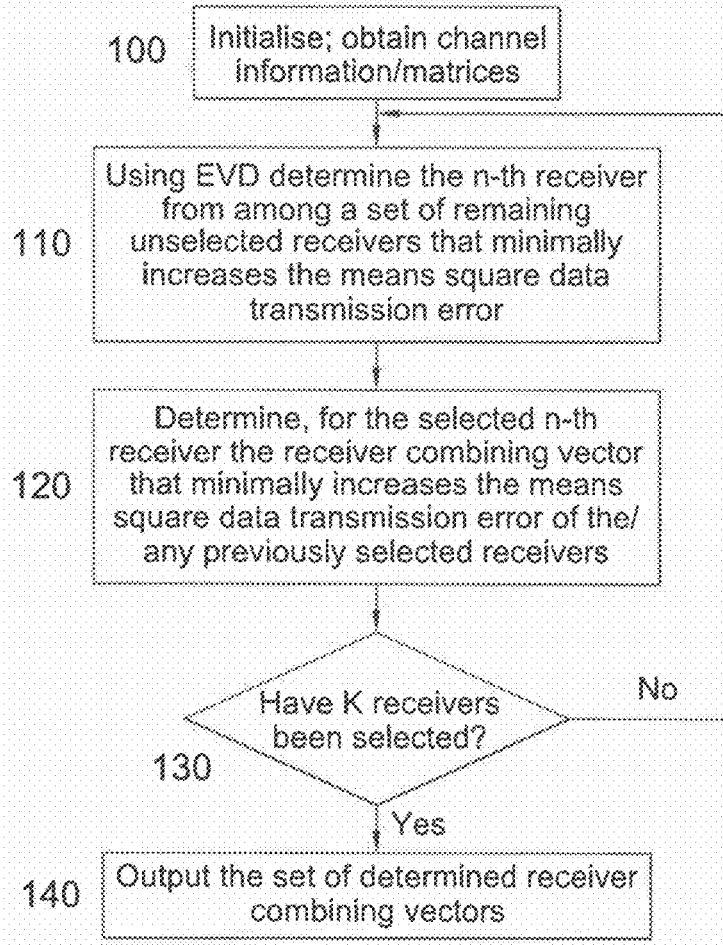
FIG. 2 shows a flow chart of a first algorithm according to an embodiment.

Algorithm N-I can be expressed in a simplified manner in the way shown in FIG. 2. In step 100 channel data is obtained and initialisation steps, such as those of steps 1 and 2 of Table 1 are performed. In step 110 the receiver that minimally contributes to the data transmission means square error of the precoder is determined. This is achieved by using eigenvalue decomposition as discussed above. One eigenvalue decomposition operation for each of the unselected receivers in the set Δ is required every time step 110 is performed. The receiver with the highest maximum eigenvalue from among all of the unselected receivers is identified in step 110 and chosen as the next receiver in the order.

TABLE 1

Algorithm N-I, General Computation of Receiver combining vectors with Greedy receiver Ordering

| | |
|---|---|
| 1 | input $H_k(k = 1, 2, \ldots, K)$, $\alpha$, $\Delta = \{1, 2, \ldots, K\}$, $\Omega = \emptyset$ |
| 2 | Initialization: compute $A^{-1} = \alpha^{-1} I_M$ |
| 3 | for n = 1: K |
| 4 | compute $O_k = (I_{N_k} + H_k A^{-1} H_k^H)^{-1} H_k A^{-2} H_k^H$, $\forall k \in \Delta$ |
| 5 | compute EVD: $O_k = E_k D_k E_k^{-1}$, $\forall k \in \Delta$ where $D_k = \text{diag}(d_{k,1}, d_{k,2}, \ldots, d_{k,N_k})$ |
| 6 | $\{\bar{k}_n, \bar{j}\} = \arg \max_{\forall k \in \Delta, j=1, \ldots, N_j} (d_{k,j})$ |
| 7 | $c_{\bar{k}_n} = E_{\bar{k}_n}(:,\bar{j})^H$, $\hat{h}_{\bar{k}_n} = c_{\bar{k}_n} H_{\bar{k}_n}$, $g = \hat{h}_{\bar{k}_n} A^{-1}$ |
| 8 | update $A^{-1} \leftarrow A^{-1} - g^H (1 + g \hat{h}_{\bar{k}_n}^H)^{-1} g$ |
| 9 | $\Omega = \Omega \cup \bar{k}_n$, $\Delta = \Delta \backslash \bar{k}_n$ |
| 10 | End |
| 11 | output: combining vectors $c_k (1, 2, \ldots, K)$ |

In step 120 the receiver combining vector for which the thus selected receiver contributes minimally to the data transmission mean square error of the thus far selected receivers and itself is then determined. If, in step 130 it is determined that the number of selected receivers correspond to the maximum number of desired receivers, or to a maximum number of receivers that can be supported by the MIMO system, then the algorithm proceeds to step 140, where the receiver combining vectors for all selected receivers are made available. These receiver combining vectors can, for example, be transmitted to the individual receivers, so that the receivers can start using the appropriate receiver combining vector in data communication between the transmitter and the receivers. If it is determined in step 130 that further receivers should be selected, then the algorithm returns to step 120 to select the next receiver in the order.

In the following a methods reducing the complex of the above algorithm is discussed.

Two Low-Complexity Algorithms

Low-Complexity Matrix Inversion

The complexity of the N-I algorithm can be reduced if the number of matrix inversions required for computing the matrix $O_k$ is reduced. In the following an alternative way of computing matrix inversion is disclosed. Applying the matrix inversion lemma of equation (11) to the matrix inverted that is required by line 4 of the N-I algorithm provides:

$$(I_{N_k} + H_k A^{-1} H_k^H)^{-1} = I_{N_k} - I_{N_k} H_k (A + H_k^H H_k)^{-1} H_k^H \quad (21)$$

The inversion of matrix $A + H_k^H H_k$ in equation (21) can be calculated by matrix update. Applying the matrix inversion lemma of equation (11) again to the matrix that is to be inverted on the right hand side of equation (21) but this time using the vector $a^H = H_k(j,:)$ for $j = 1, \ldots, N_i$ the matrix $(A + H_k^H(:,j) H_k(:,j))^{-1}$ can be updated step-by-step for $j = 1, \ldots, j = N_i$.

Fast Receiver Ordering

The above discussed algorithm N-I requires that, in each loop, the receiver having the largest value of maximal eigenvalue is identified. As a consequence a large number of EVD decompositions are required. In the n-th loop, for example, there are K−n+1 EVD decompositions needed. In the following a way of determining the order in which the receiver combining vectors should be computed according to the criteria of minimising distortion is discussed. This way of computed selecting receivers is less greedy/computationally expensive than the above discussed "greedy" algorithm N-I. Once a predetermined receiver order has been established, only one EVD is needed in each loop for computing the receiver combining vector of the selected receiver. The algorithm described in the following brings about a negligible performance loss compared to the greedy receiver ordering algorithm N-I.

In the "greedy" N-I algorithm for receiver selection and the calculation of receiver combining vectors a loop n=2:K is performed. In each of the iterations of this loop K−n EVD decompositions need to be calculated. Additionally K EVD decompositions need to be calculated to identify the first selected receiver, prior to the start of the loop. Following the EVD decompositions in each pass of the loop the receiver combining vectors of all receivers are calculated according to equation (19). However, only one of these receiver combining vectors is selected. The other vectors are discarded. In the following the nature of all of the combining vectors computed in the first loop is considered.

Equation (16) provides, for each receiver, the objective function for determining a receiver combining vector:

$$c_k = \max_{\|\hat{c}_k\|=1} \frac{\hat{c}_k H_k A^{-2} H_k^H \hat{c}_k^H}{\hat{c}_k (I_{N_k} + H_k A^{-1} H_k^H) \hat{c}_k^H} = \max_{\hat{h}_k = \hat{c}_k H_k, \|\hat{c}_k\|=1} \frac{\hat{h}_k A^{-2} \hat{h}_k^H}{1 + \hat{h}_k A^{-1} \hat{h}_k^H} \quad (22)$$

Using $A^{-1} = \alpha^{-1} I_M$, as in the first loop of Algorithm N-I, equation (22) becomes:

$$c_k = \max_{\hat{h}_k = \hat{c}_k H_k, \|\hat{c}_k\|=1} \frac{\alpha^{-2} \|\hat{h}_k\|^2}{1 + \alpha^{-1} \|\hat{h}_k\|^2} = \max_{\hat{h}_k = \hat{c}_k H_k, \|\hat{c}_k\|=1} \|\hat{h}_k\|^2 \quad (23)$$

The solution of equation (23) is the left singular vector corresponding to the largest singular value of $H_k$. Using a singular value decomposition (SVD) of receiver channel matrix as $H_k = U_k S_k V_k^H$ value provides the desired receiver combining vector according to:

$$c_k = U_k(1,:)^H \quad (24)$$

In the first loop, the EVD-based and SVD-based solutions are consequently identical. As the SVD-based solution selects the receiver that has the largest effective channel power, it is now also clear that the EVD based solution also selects the receiver with the largest effective channel power in the first loop.

Once the SVD of all channel matrices has been completed the so determined receiver combining vectors $c_k$ of all receivers can preliminarily and for the purpose of receiver selection be used alongside the receivers channel matrix to compute the receivers' effective channels $\hat{h}_k$, using equation (1). In effect, through the use of the preliminary receiver combining vector $c_k$ all receivers are treated as if they have only one receive antenna with (effective) channel vector $\hat{h}_k$. This renders the ordering of the receivers less computationally expensive and was found to introduce only negligible additional contributions to the means square error, if any.

Algorithm N-I is then used to sort the receivers. Thus the receivers that minimally contributes to the MSE of the previously precoded receivers is identified in a step-by-step fashion.

Since only the effective channels vectors of receivers are the input to Algorithm N-I, there is no need to make matrix inversions and EVD decompositions in loops other than loop 1. Algorithm N-I is therefore modified as follows to provide the new algorithm N-I-A shown in Table 2.

TABLE 2

Algorithm N-I-A, Fast Receiver Ordering Algorithm

| | |
|---|---|
| 1 | $H_k(k = 1, 2, \ldots, K), \alpha, \Delta = \{1, 2, \ldots, K\}, \Theta = \emptyset$ |
| 2 | Compute, for each receiver k of the set $\Delta$, the receiver combining vector $c_k$, either using the EVD-based method of equation (19) or the SVD-based method of equation (24). Let $d_k$ of each receiver either be the largest eigenvalue obtained by EVD-based method applied to the channel matrix of each receiver or the largest singular value obtained by SVD-based method applied to the channel matrix of each receiver. |
| 3 | compute $\hat{h}_k = c_k H_k, \forall k \in \Delta$ |
| 4 | compute $A^{-1} = \alpha^{-1} I_M$ |
| 5 | $\bar{k}_1 = \underset{k \in \Delta}{\mathrm{argmax}}\ d_k$ |
| 6 | $\Theta = \Theta \cup \bar{k}_1, \Delta = \Delta \setminus \bar{k}_1, g_{\bar{k}_1}^- = \hat{h}_{\bar{k}_1}^- A^{-1}$ |
| 7 | for n = 2: K |
| 8 | update $A^{-1} \leftarrow A^{-1} - g_{\bar{k}_{n-1}}^{-H}(1 + g_{\bar{k}_{n-1}}^- \hat{h}_{\bar{k}_{n-1}}^{-H})^{-1} g_{\bar{k}_{n-1}}^-$ |
| 9 | compute $g_k = h_k A^{-1}, \forall k \in \Delta$ |
| 10 | $\bar{k}_n = \underset{k \in \Delta}{\mathrm{argmax}}(1 + g_k h_k^H)^{-1} \|g_k\|^2$ |
| 11 | $\Theta = \Theta \cup \bar{k}_n, \Delta = \Delta \setminus \bar{k}_n$ |
| 12 | End |
| 13 | Output: set of ordered indices of receivers $\Theta$ |

Steps 2-4 of the above ordering algorithm are discussed above with respect of either the general solution provided by the greedy algorithm N-I or with respect to the above comparison of EVD and SVD based methods of computing receiver combining vectors the first time the loop in the greedy algorithm N-I is executed. In step 5, the first step of ordering the receivers, the receiver associated with the largest eigenvalue/singular value is identified and added, in step 6, to the set of selected receivers $\Theta$ and removed from the set of unselected receivers $\Delta$. An update matrix $g_{\bar{k}_1}$ for updating the matrix A in conformity with equation (15) above is further defined in step 6.

Each of the other K−1 receivers is selected during one execution of the loop initiated in line 7 of the Table 2 algorithm. The selection of each receiver starts with an update of the matrix $A^{-1}$ to take the vector $g_{\bar{k}_1}$ of the first selected receiver $\bar{k}_1$ defined in step 6 or the matrix $\bar{k}_{n-1}$ of the receiver selected in a previous pass n−1 of the loop, as defined in step 9 into account. In step 9 a new vector $g_k$ is computed.

In step 10 equation (15) is solved. The first term on the right hand side of equation (15) can hereby be ignored, as it is the same for all receivers k that are still part of the set $\Delta$ of unselected receivers. The term $A^{-1}$ of equation (15) can hereby be ignored as the same for all unselected users. The result of step 10 is the index of the receiver that minimises the MSE of the precoder when taking previously selected receivers into account. A newly selected receiver $g_k$ is added, in step 11, to the set of selected receivers $\Theta$ and removed from the set of unselected receivers $\Delta$. In step 11 of the algorithm shown in Table 2 the newly selected receiver is included in the set $\Theta$ of selected receivers and excluded from the set $\Delta$ of unelected receivers. The set $\Theta$ of selected receivers forms the output of the algorithm shown in Table 2.

Figure 3:
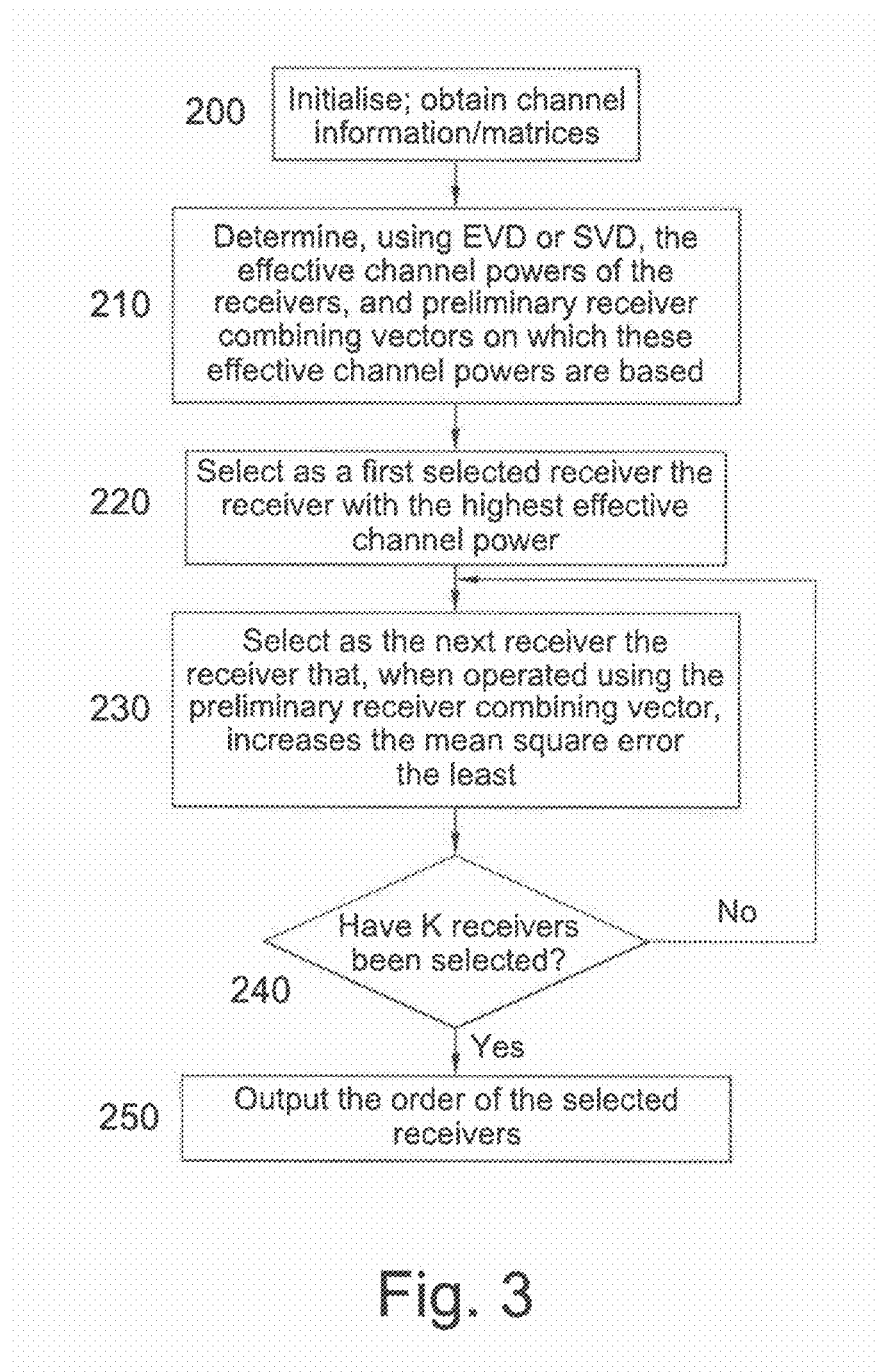
FIG. 3 shows a receiver selection algorithm with reduced computational complexity according to an embodiment.

The algorithm N-I-A can be illustrated in a more general form in the form shown in FIG. 3. In step 200 of the FIG. 3 algorithm the initialisation steps also used in step 100 of FIG. 2 are performed. In step 210 the effective channel power for each of the possible receivers is determined. This can be done using EVD or SVD, as discussed above. Preliminary receiver combining vectors are also determined for each of the possible receivers, wherein the preliminary receiver combining vectors are the vectors that would, if used in the receivers, maximise the effective channel power of the receiver. It will, however, be appreciated that the preliminary receiver combining vectors are not intended for use in the receivers and merely provide an aide for determining a suitable order in which the actual receiver combining vectors are to be determined.

In step 220 the receiver that, when operated using its preliminary receiver combining vector, has the highest effective channel power is selected as the first receiver in the order. In step 230 subsequent receivers are selected such that the next selected receiver is the receiver that, when operated using its preliminary receiver combining vector, increases the means square data transmission error for the previously selected receivers and itself the least. Step 230 is repeated until it is determined in step 240 that the number of receivers provided in order corresponds to a desired number of receivers or to a maxim number of receivers that can be supported by the MIMO system, such as a number of receivers that correspond to the maximum number of data streams K. Once the correct number of receivers has been placed in order, the order of these receivers is output.

Pseudo code of the N-I algorithm shown in Table 1 can be modified to account for the altered receiver selection algorithm provided by the above discussed algorithm, as illustrated in Table 2. A thus altered receiver algorithm, referred to in the following as algorithm N-II, is illustrated in Table 3.

TABLE 3

Algorithm N-II, Low-Complexity Computation of Receiver combining vectors with Fast Receiver Ordering

| | |
|---|---|
| 1 | input $H_k (k = 1, 2, \ldots, K)$, $\alpha$, $\Delta = \{1, 2, \ldots, K\}$, $\Omega = \emptyset$ |
| 2 | initialization: $A^{-1} = \alpha^{-1} I_M$ |
| 3 | compute $\hat{c}_k$ either by EVD-based method in equation (19) or SVD-based method in equation (24) |
| 4 | $\hat{h}_k = \hat{c}_k H_k \, \forall k \in \Delta$ |
| 5 | sort receivers by using algorithm in Table 2 to provide $\Theta = (\bar{k}_1, \bar{k}_2, \ldots, \bar{k}_K)$ |
| 6 | $\hat{h}_{\bar{k}1} = \hat{c}_{\bar{k}1}^- H_{\bar{k}1}^-$, $g = \hat{h}_{\bar{k}1}^- A^{-1}$ |
| 7 | for n = 2: K |
| 8 | update $A^{-1} \leftarrow A^{-1} - g^H (1 + g h_{\bar{k}n-1}^{-H})^{-1} g$ |
| 9 | Compute $O = \left( I_{N_{\bar{k}_n}} + H_{\bar{k}_n} A^{-1} H_{\bar{k}_n}^H \right)^{-1} H_{\bar{k}_n} A^{-2} H_{\bar{k}_n}^H$ |
| 10 | Compute EVD: $O = E D E^{-1}$, $D = \text{diag}(d_1, d_2, \ldots, d_{N_{\bar{k}_n}})$ |
| 11 | $\bar{j} = \arg \max_{j=1, \ldots, N_{\bar{k}_n}} (d_j)$ |
| 12 | $\hat{c}_{\bar{k}n} = E(:, \bar{j})^H$, $\hat{h}_{\bar{k}n}^- = \hat{c}_{\bar{k}n}^- H_{\bar{k}n}^-$, $g = \hat{h}_{\bar{k}n}^- A^{-1}$ |
| 13 | End |
| 14 | output: combining vectors $c_k (k = 1, 2, \ldots, K)$ |

A comparison of algorithms N-I and N-II reveals that steps 1 and 2 of both algorithms are identical and thus do not require explicit discussion. Algorithm N-II, however, differs in steps 3 to 5 from algorithm as in steps 3 to 5 of algorithm N-II the order of the receivers is determined in the manner disclosed in Table 2/Algorithms N-I-A. The loop initiated in step 7 of Table 3 and running to step 13 of Table 3 uses the same manner as algorithm N-I of Table 1 for determining the receiver combining vectors, albeit dispensing with receiver selection step 6 of algorithm N-I, as the order in which the receiver combining vectors are to be determined has already been determined in steps 3 to 5 of the algorithm N-II. It will be appreciated that the loop extending from step 7 to step 13 of the algorithm N-II bases the determination of the actual receiver combining vector (as opposed to the preliminary receiver combining vector used for determining the receiver order) only on final receiver combining vectors that have been determined in previous passes of the loop, and on the receiver combining vector of receiver $k_j$ determined in the EVD or SVD decomposition that forms part of step 3 of algorithm N-II/step 2 of algorithm N-I-A.

The inversion of matrix $$I_{N_{\bar{k}_n}} + H_{\bar{k}_n} A^{-1} H_{\bar{k}_n}^H$$

in step 9 of algorithm N-II can be computed by the matrix update method described above in the section on low-complexity matrix inversion.

Figure 4:
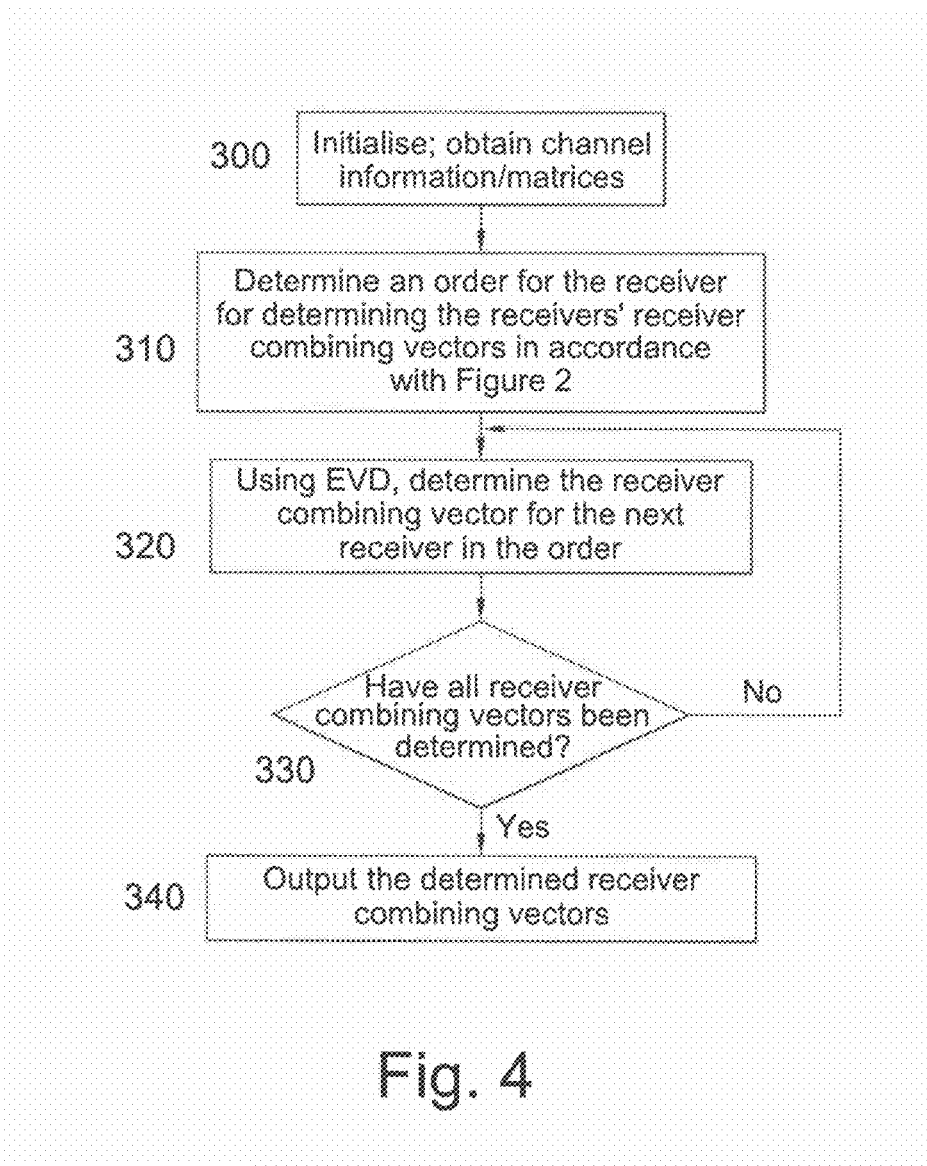
FIG. 4 shows a combination of the two algorithms shown in FIGS. 2 and 3.

FIG. 4 shows a conceptual illustration of the algorithms N-II. Steps 300 and 340 correspond to steps 100 and 140 in FIG. 2. While in FIG. 2 both of steps 110 and 120 are placed inside a loop, only the step in which the actual receiver combining vector is determined, step 320 in FIG. 4 (corresponding to step 120 in FIG. 2) is placed in the loop. Placing the selection step 310 of FIG. 3 outside of the loop is possible because the selection process of FIG. 2, which is used in FIG. 3 does not require the actual receiver combination vectors (which in both the FIGS. 2 and 4 processes are determined inside the loop by steps 120 and 320 respectively) to determined the order in which the actual receiver combining vectors are to be determined, as discussed above. A consequence of this is that the number of EVDs or SVD performed in the ordering step (steps 110 and 310 respectively) does, in FIG. 4, not have to be placed in the loop. Consequently the number of EVDs or SVDs necessary for determining the receiver combining vectors can be reduced.

Comparing the number of EVD decompositions of two algorithms N-I and N-II, the number of EVD decompositions needed in algorithm N-I for selecting a single receiver corresponds to the number of receivers that remain unselected at the time of receivers selection. Algorithm N-I thus needs:

$$K+(K-1)+(K-2)+\ldots+1 = K(K+1)/2 \quad (25)$$

EVD decompositions. Algorithm N-II on the other hand needs K EVD decompositions to select the first receivers and determine the receiver order in the N-I-A part of the algorithm illustrated in Table 2 and a further K−1 EVD decompositions to determine the actual receiver combining vectors that minimise the MSE of the precoder for the selected receiver order. Algorithm N-II thus requires:

$$K+K-1 = 2K-1 \quad (26)$$

EVD decompositions. Thus, for a large number of receivers the saving in computational resources achieved by algorithm N-II are very significant.

Alternative Implementations

Both algorithms N-I and N-II make/may make use the EVD decomposition of matrix O. Extensive simulations have, however, shown that O is can be almost a normal matrix. Therefore, the maximal eigenvalue and maximal singular value of O, though different, are quite similar. The EVD decomposition step used in algorithms N-I and potentially used in algorithm N-II can thus be replaced by a SVD operation without introducing large errors.

Moreover, hardware implementing the N-I or N-II algorithms may comprise SVD modules that are, at times, idle. Such modules may be re-used for determining maximal singular values of the matrix O as part of the algorithms N-I and N-II, if the EVD in these algorithms is replaced by a SVD. Algorithms N-I and N-II modified in this manner result in Algorithms N-III and N-IV. The person skilled in the art will readily appreciate that pseudocodes of these algorithms N-III and N-IV are copies of the pseudocodes of algorithms N-I and N-II respectively but with SVD operations instead of EVD operations.

Codebook-Based Receiver Combining Vectors

From the above it is evident that receiver combining vectors of receivers should be jointly designed to minimise distortion of the transmitted signals. The algorithms proposed above, however, require either EVD or SVD decompositions. In the following a way of further reducing the number of EVD/SVD decompositions is discussed.

The problem of interest is to find a combining vector $c_k$ for receiver k that minimizes the objective function in equation (16). As discussed above, the optimal solution requires eigenvalue decomposition, while a near optimal solution can be achieved using single value decomposition.

To reduce the number of EVD and/or SVD operations further a codebook of combining vectors, in which each codebook vector has unit norm, may be used. The concept of codebook has previously been used in digital communications. For example in multiuser precoding, the codebook contains precoding vectors for receivers, as disclosed in M. Sharif and B. Hassibi, "On the capacity of MIMO broadcast channels with partial side information," IEEE Transactions on Information Theory, vol. 51, no. 2, pp. 506-522, February 2005, the content of which is incorporated herein by this reference. Codebooks containing receiver combining vectors are disclosed in C.-B. Chae, D. Mazzarese, and R. W. Heath, "Coordinated Beamforming for Multiuser MIMO Systems with Limited Feedforward," Fortieth Asilomar Conference on Signals, Systems and Computers, 2006. ACSSC '06, vol., no., pp. 1511-1515, Oct. 29, 2006-Nov. 1, 2006 (the content of which is incorporated herein by this reference) and in C.-B. Chae, D. Mazzarese, T. Inoue, and R. W. Heath, "Coordinated Beamforming for the Multiuser MIMO Broadcast Channel With Limited Feedforward," IEEE Transactions on Signal Processing, vol. 56, no. 12, pp. 6044-6056, December 2008 (the content of which is incorporated herein by this reference). In the following the application of the known concept of using a codebook of predetermined values is applied to the design of receiver combining vectors. The novelty of this approach is the combination of the codebook concept with the design criterion for selecting receiver combining vectors of equation (16) together with either of the above described greedy receiver ordering method of algorithm N-I or fast receiver ordering method of algorithm N-II.

The algorithms proposed above can be modified to incorporate codebook-based receiver combining vectors. Table 4, for example, shows a modified Algorithm N-I using codebook-based combining vectors.

One suitable codebook structure for receivers may comprise two parts, one part comprising adaptive codewords and one part comprising fixed codewords. The use of adaptive codewords is envisaged to provide a way of adapting to the real channel matrices, while the use of fixed codewords gives more freedom for systems to optimize the precoding matrix. For example, the following codebook $C_k$ for receiver k consists of $3N_k+1$ combining vectors.

$C_k(1:N_k,:)=I$ (identity matrix of proper size), $C_k(N_k:2N_k,:)=F$ (discrete Fourier transfrom matrix), $C_k(2N_k:3N_k,:)=R$ (unitary random matrix), $$C_k(3N_k+1,:)=U_k(:,1)^H \text{ (where } H_k=U_k S_k V_k^H\text{).} \quad (27)$$

The last codeword, $C_k(3N_k+1,:)$, is the left singular vector corresponding to the dominant singular value, which is the adaptive codeword. The codebook also includes the antenna selection case (line 1 of equation (27)). Thus this codebook is a generalization of dominant eigenmode selection as disclosed in A. Paulraj, R. Nabar, and D. Gore, "Introduction to Space-Time Wireless Communications", Cambridge, U.K., Cambridge University Press, 2003, incorporated by reference above, and receive antenna selection as disclosed in S. Sigdel and W. A. Krzymien, "Simplified Fair Scheduling and Antenna Selection Algorithms for Multiuser MIMO Orthogonal Space-Division Multiplexing Downlink," IEEE Transactions on Vehicular Technology, vol. 58, no. 3, pp. 1329-1344, March 2009, which has also been incorporated by reference above. The present algorithm is distinguished over these publications in that the present algorithms not only find a suitable criterion to select the receive combination mode for each receiver, but also jointly select the (best) receiver operation modes of all receivers that minimise the MSE of the precoder.

TABLE 4

Algorithm N-V, Codebook-based Design of Receiver combining vectors with Greedy Receiver Ordering

| | |
|---|---|
| 1 | input $H_k(k = 1, 2, \ldots, K)$, $\alpha, \Delta = \{1, 2, \ldots, K\}$, $\Omega = \emptyset$ codebook C of size R × M |
| 2 | Initialization: compute $\overline{H}_k = CH_k \forall k \in \Delta$ |
| 3 | for n = 1: K |
| 4 | $\{\overline{k}_n, \overline{j}\} = \arg\max_{k \in \Delta, j=1,\ldots,R} \dfrac{\overline{H}_k(j,:) A^{-2} \overline{H}_k(j,:)^H}{1 + \overline{H}_k(j,:) A^{-1} \overline{H}_k(j,:)^H}$ |
| 5 | $c_{\overline{k}_n} = C(\overline{j},:)$, $\hat{h}_{\overline{k}_n} = \overline{H}_{\overline{k}_n}(\overline{j},:)$, $g = \hat{h}_{\overline{k}_n}^H A^{-1}$ |
| 6 | update $A^{-1} \leftarrow A^{-1} - g^H(1 + g\hat{h}_{\overline{k}_n}^H)^{-1} g$ |
| 7 | $\Omega = \Omega \cup \overline{k}_n$, $\Delta = \Delta \backslash \overline{k}_n$ |
| 8 | End |
| 9 | output: combining vectors $c_k$ (k = 1, 2, . . . , K) |

Discussing now the algorithm N-V illustrated in Table 4 in more detail, in the first step the starting parameters are defined in the same manner as in the other above discussed algorithms. Additionally the codebook C is defined in step 1. The codebook may only comprise a number of possible receiver combining vectors that are fixed. The same codebook may in this case be used for all receivers. Alternatively, different codebooks, each comprising only fixed possible receiver combining vectors may be used for different receivers or receiver groups. As discussed above with reference to equation (27) the codebooks may further comprise an adaptive receiver combining vector. In this case the codebook $C_k$ used differs from receiver to receiver, at least in the adaptive possible receiver combining vector, and defining the codebooks $C_k$ in the first step of the Table 4 algorithm also comprises determining the left singular vector corresponding to the dominant singular value using an singular value decomposition of the channel matrix $H_K$. The fixed possible receiver combining vector section of the codebooks $C_k$ used for the different receivers can also differ.

Following the definition of the codebooks $C_k$ the channel matrix $H_K$ is multiplied with the relevant codebook $C_k$ for each receiver, to create for each receiver, a matrix $\overline{H}_K$ comprising all possible effective channels that are permitted by the entries in the codebook $C_k$.

These effective channel matrices $\overline{H}_K$ form the input for a loop extending over steps 3 to 8 of the algorithm N-V of Table 4. This loop is executed K times. In each pass of the loop the one of the combining vectors in the codebook $C_k$ that, if used by receivers $\overline{k}_n$ increases the MSE of the precoder least. This selection is achieved by solving the form of equation (16) shown in step 4 of the N-V algorithm of Table. The search performed in step 4 provides the index of the combining vector in the codebook $C_k$ that minimally increases, when used for receiver $\overline{k}_n$, the MSE of the precoder. This vector is then extracted from the codebook $C_k$ and assigned as the receiver combining vector $c_{\overline{k}_n}$ in step 5 of the algorithms N-V. Equally, the effective channel matrix of a receiver $\overline{k}_n$ is extracted from the effective channel matrix $\overline{H}_K$, to allow updating of the vector g in step 5 and subsequent updating of the matrix $A^{-1}$ in step 6. This updating of the matrix $A^{-1}$ of course ensures that, when the receiver combining vector of the next receiver is selected on the next pass of the loop, this selection takes due notice of the operation of those receivers that have had their receiver combining vectors already selected, so that MSE of the precoder is minimised. In step 7 the receiver for which a receiver combining vector has been extracted from the codebook is added to the set of receivers $\Omega$ and removed from the set of receivers $\Delta$.

It will be appreciated from the above that algorithm N-V requires K SVD decompositions in total, one for each of the K users. If the SVD-based/adaptive codeword for i-th receiver is selected, the base station will send a specific instruction to the i-th receiver, instructing the i-th receiver to generate the SVD-based receiver combining vector. Thus, there is no need to send the whole combining vector to the receiver. Additionally, if the i-th receiver terminal does not have a SVD module, the codebook for this receiver may remove the last codeword; in this case, there are only fixed codewords for this receiver.

Figure 5:
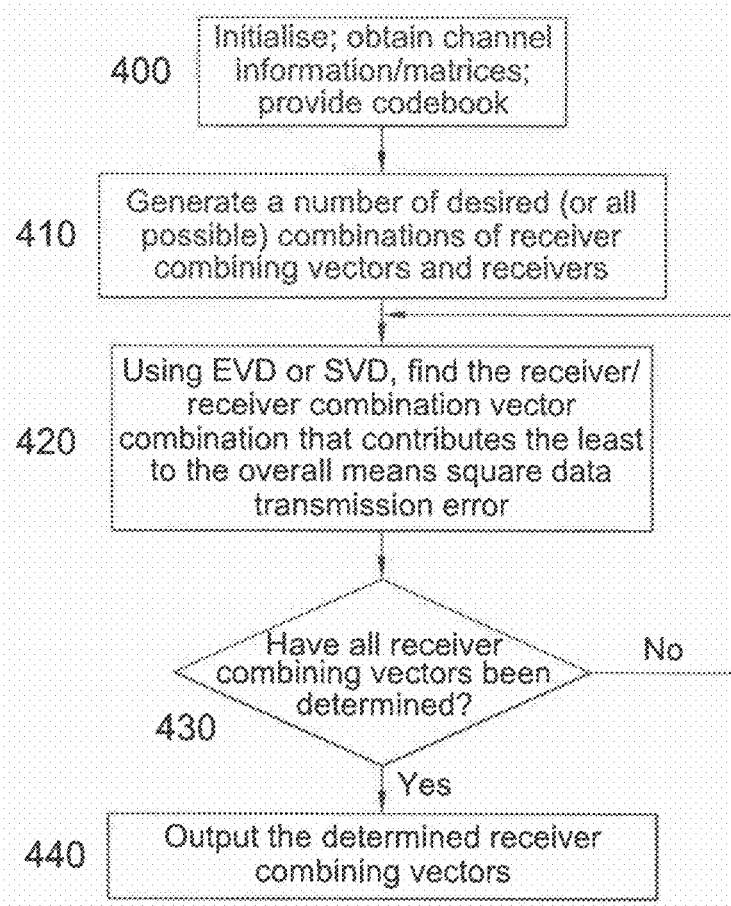
FIG. 5 shows an alternative, codebook based algorithm according to an embodiment.

FIG. 5 show a schematic of the algorithm N-V. The initialisation step 400 is the same as the initialisations steps 100, 20 and 300 used in FIGS. 2 to 4 but additionally includes the provision of a codebook, such as the codebook of equation (27). In step 410 a number of desired combinations of receivers and receiver combination vectors (from the codebook) are then generated. Multiplying the codebook with the channel matrix of a receiver provides all of the possible combinations of the receiver combining vectors in the codebook and the receiver. Such a multiplication can be performed for every receiver. In step 420 the one of the combinations that increases the mean square data transmission error of the thus far selected receivers is determined. It will be appreciated that, by making this selection of a combination, not only the receiver is selected but also the receiver combining vector that allows the receiver to operate in a manner in which minimises the receiver's contribution to means square error. Once a receiver combination vector has been found for a sufficient/desired number of receivers the receiver combination vectors can be output (for example to the receivers) in step 440.

SUMMARY OF EMBODIMENTS

The above discussed algorithms are summarised and compared in Table 5.

| Algorithm | Summary |
|---|---|
| N-I | Greedy receiver ordering |
| | Combining vectors are eigenvectors corresponding to the largest eigenvalues |
| | Requires K(K + 1)/2 EVD decompositions |
| N-I-A | Fast receiver ordering method to avoid greedy receiver ordering |
| N-II | Low-complexity, fast, predetermined receiver ordering |
| | Combining vectors are eigenvectors corresponding to the largest eigenvalues |
| | Require 2K − 1 EVD decompositions |
| N-III | Alternative implementation of Algorithm N-I |
| | Greedy receiver ordering |
| | Combining vectors are the left singular vector corresponding to the largest singular values |
| | Require K(K + 1)/2 SVD decompositions. |
| N-IV | Alternative implementation of Algorithm N-II |
| | Fast, predetermined receiver ordering |
| | Combining vectors are the left singular vectors corresponding to the largest singular values |
| | Require 2K − 1 SVD decompositions |
| N-V | Reduces complexity of Algorithms N-I/II/III/IV |
| | Combining vectors are searched for/selected from a codebook |
| | Requires a number of SVD decompositions that corresponds to the number of users that determine that the optimal codeword is the codeword determined using SVD (thus the number of SVD composition required is at most K) |

EXAMPLES

The performance of the above algorithms has been evaluated by means of simulations and compared to the performance of the most well-known methods: dominant eigenmode (an example of which is disclosed in A. Paulraj, R. Nabar, and D. Gore, Introduction to Space-Time Wireless Communications, Cambridge, U.K.: Cambridge University Press, 2003) and receive antenna selection of S. Sigdel and W. A. Krzymien, "Simplified Fair Scheduling and Antenna Selection Algorithms for Multiuser MIMO Orthogonal Space-Division Multiplexing Downlink," IEEE Transactions on Vehicular Technology, vol. 58, no. 3, pp. 1329-1344, March 2009. The latter two methods are also referred to in the following as conventional algorithms C-I and C-II, respectively.

The Rayleigh channel model has been employed in the simulations, where receiver's channels are uncorrelated. The base station has 4 transmit antennas. There are 4 receivers. 4QAM signal is used for all receivers. receivers' channel matrices are completely known at the base station. The adaptive codebook given in equation (27) has been used for all receivers.

Figure 6:
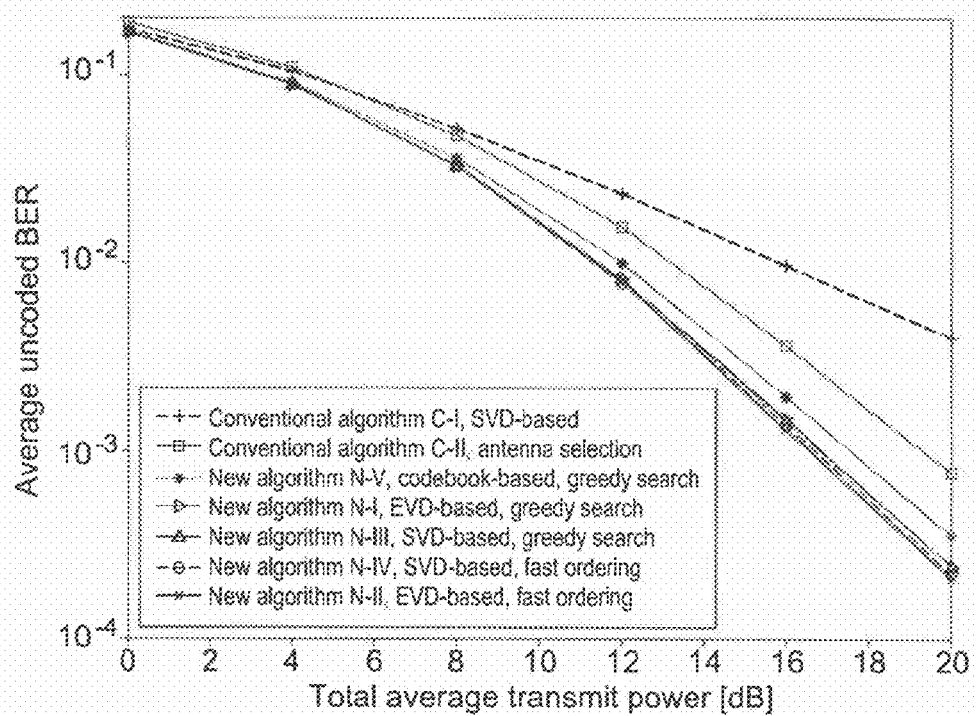
FIG. 6 illustrates simulations results of a performance comparison between conventional algorithms and new algorithms introduced herein for a system employs linear MMSE precoding, 4 transmit antennas, 4 receivers, each receiver has 2 receive antennas, wherein 4QAM is used.
Figure 7:
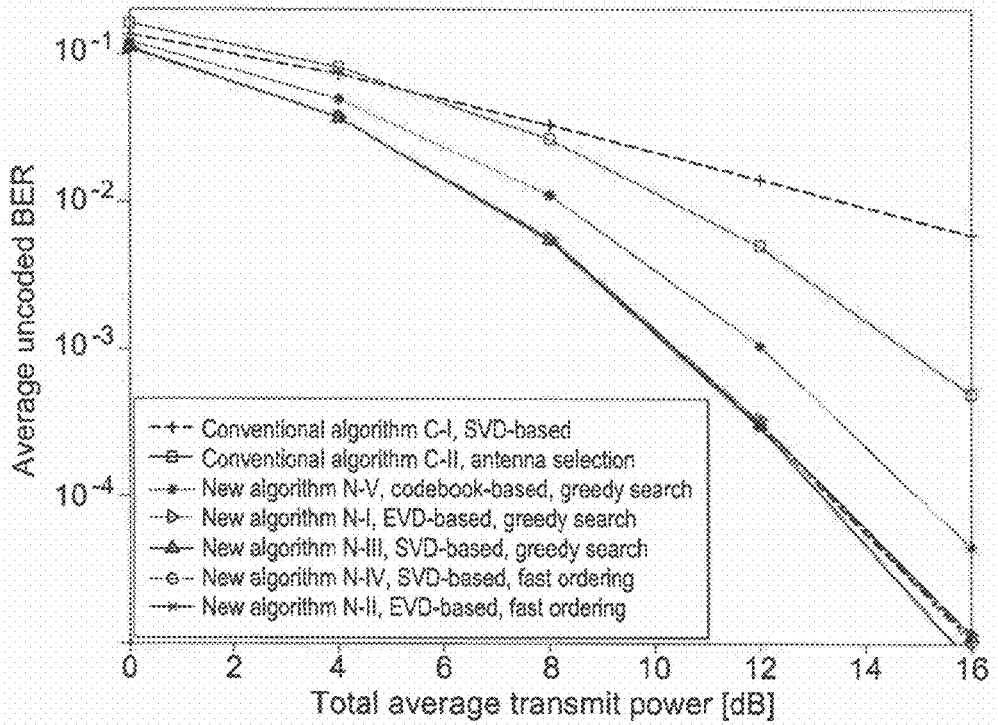
FIG. 7 shows a comparison of the performances of conventional and new algorithms for a system employing linear MMSE precoding, 4 transmit antennas, 4 receivers, each receiver has 4 receive antennas and 4QAM.

In FIGS. 6 and 7 plot the total average uncoded bit error rate (BER) of the system against the total transmit power and compare the performances of the proposed algorithms are shown for linear MMSE precoding when each receivers has 2 and 4 receive antennas respectively. It is shown that all of the above discussed methods outperform the conventional techniques C-I and C-II. Especially, the algorithms with fast receiver ordering perform slightly better than the algorithms with greedy receiver ordering at high signal-to-noise (SNR)

ratio. This result reveals that the greedy receiver search does not always lead to the optimal receiver order.

While certain embodiments have been described, these embodiments have been presented by way of example only, and are not intended to limit the scope of the invention. Indeed, the novel methods and apparatus described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method performed in a transmitter side of a multiuser minimum square error linear precoding MIMO system that comprises a transmitter with a plurality of transmit antennae and a plurality of receivers, each receiver of the plurality of receivers comprising a plurality of receive antennae, the method comprising:

obtaining, for some or all of the plurality of receivers, receiver channel information quantifying properties of transmit channels between the plurality of receive antennae of the respective receiver and the plurality of transmit antennae of the transmitter;

establishing in the transmitter an order for determining the receiver combining vectors of the some or all of the plurality of receivers by selecting as a next receiver in the order the so far unselected receiver that minimally increases a mean square data transmission error, based on the receiver channel information of any receivers previously selected in the order and of unselected receivers;

wherein a number of receivers are placed in the order before receiver combining vectors that are to be used in the number of receivers are determined, and wherein prior to determining the order, determining for each receiver a preliminary receiver combining vector $c_{kp}$ that fulfills $$c_{kp} = \max_{\|\hat{c}_k\|=1} \|\hat{c}_k H_k\|^2,$$

wherein $\hat{c}_k$ corresponds to a plurality of possible receiver combining vectors and $H_k$ comprising said receiver channel information associated with the respective receiver.

2. A method according to claim 1, wherein a next, n-th receiver, in the order is selected such that, when the n-th receiver is operated using its associated preliminary receiver combining vector $c_{np}$ of the n-th receiver, the next n-th receiver minimally contributes to the mean square data transmission error.

3. A method according to claim 2, wherein the next, n-th receiver in the order is a receiver fulfilling:

$$\operatorname*{argmax}_{k \in \Delta}(1 + g_{kn}(c_{kp}H_k)^H)^{-1} \|g_{kn}\|^2$$

wherein k is an index of unselected receivers in a set $\Delta$, $H_k$ is the channel matrix of receiver k and comprises the respective receiver channel information, superscript H denotes a matrix transpose conjugate operation, $\|g_{kn}\|$ is the norm of the matrix $g_{kn}$, and $g_{kn}$ is useable for determining the n-th receiver, wherein:

$$g_{kn} = c_{kp}H_k A_n^{-1}, \forall k \in \Delta$$

wherein $A_n^{-1}$ is a matrix useable for determining the n-th receiver and including matrices $A_{n-1}^{-1}$ and $g_{k_{n-1}}$ that had been used for the selection of the preceding, (n−1)-th receiver, wherein:

$$A_n^{-1} = A_{n-1}^{-1} - g_{k_{n-1}}^H (1 + g_{k_{n-1}}(c_{k_{n-1}}H_{k_{n-1}})^H)^{-1} g_{k_{n-1}}.$$

4. A method according to claim 1, further comprising performing a singular value decomposition of a channel matrix of unselected receivers to determine a largest singular value of the channel matrix and an associated left singular vector for use as the preliminary receiver combining vector.

5. A method according to claim 4, wherein the transmitter comprises singular value decomposition calculators, and wherein said singular value decomposition calculators are used to calculate the singular value decompositions when otherwise idle.

6. A method performed in a transmitter side of a multiuser minimum square error linear precoding MIMO system that comprises a transmitter with a plurality of transmit antennae and a plurality of receivers, each receiver of the plurality of receivers comprising a plurality of receive antennae, the method comprising:

obtaining, for some or all of the plurality of receivers, receiver channel information quantifying properties of transmit channels between the plurality of receive antennae of the respective receiver and the plurality of transmit antennae of the transmitter;

establishing in the transmitter an order for determining receiver combining vectors of the some or all of the plurality of receivers by selecting as a next receiver in the order the so far unselected receiver that minimally increases a mean square data transmission error, based on the receiver channel information of any receivers previously selected in the order and of unselected receivers;

wherein a next, n-th receiver in the order has a receiver index k from among a set $\Delta$ of unselected receivers and a receiver combining vector $\hat{c}_k$ fulfilling:

$$\arg\max_{k \in \Delta, \|\hat{c}_k\|=1} \frac{\hat{c}_k H_k A^{-2} H_k^H \hat{c}_k^H}{\hat{c}_k (I_{N_k} + H_k A^{-1} H_k^H) \hat{c}_k^H}.$$

wherein $H_k$ is the channel matrix of receiver k comprising the receiver channel information and superscript H denotes a matrix transpose conjugate operation, $I_{N_k}$ is a $N_k \times N_k$ identity matrix, wherein $N_k$ is the number of receive antennae of each receiver, wherein:

$$A_n^{-1} = A_{n-1}^{-1} - g_{n-1}^H (1 + g_{n-1}(c_{k_{n-1}}H_{k_{n-1}})^H)^{-1} g_{n-1}$$

wherein $A_n^{-1}$ is the matrix $A^{-1}$ for the selection of a current, n-th receiver in the order, $A_{n-1}^{-1}$ is the matrix $A^{-1}$ that has been used for the selection of the preceding, (n−1)-th, receiver in the order, $c_{k_{n-1}}$ is the receiver combining vector of the (n−1)-th receiver and $H_{k_{n-1}}$ is the channel matrix of the (n−1)-th receiver, with $A1^{-1} = \alpha^{-1}I_M$, wherein M is the number of transmitter antennae of the transmitter, $\alpha = K/E_{tr}$, wherein K is the number of data streams between the transmitter and the receivers and $E_{tr}$ is the total transmitter power; and $$g_{n-1} = c_{k_{n-1}}H_{k_{n-1}}A_{n-1}^{-1}.$$

7. A method according to claim 6, further comprising performing an eigenvalue decomposition of the matrix $O_k=(I_{N_k}+H_k A^{-1}H_k^H)^{-1}H_kA^{-2}H_k^H$, for some or all receivers k from among the set $\Delta$ of unselected receivers, wherein the next receiver selected for the order is the receiver for which the maximum eigenvalue of the matrix $O_k$ is the largest.

8. A method according to claim 7, wherein the inverse of the matrix $(I_{N_k}+H_kA^{-1}H_k^H)$ is calculated by calculating $I_{N_k}-I_{N_k}H_k(A+H_k^HH_k)^{-1}H_k^H$.

9. A method according to claim 8, wherein the inverse of the matrix $(A+H_k^HH_k)$ is calculated by matrix update.

10. A method according to claim 6, further comprising performing a singular value decomposition of the matrix $O_k=(I_{N_k}+H_kA^{-1}H_k^h)^{-1}H_kA^{-2}H_k^H$, for some or all receivers k from among the set $\Delta$ of unselected receivers, wherein the next, n-th receiver in the order is the receiver for which the maximal singular value of the matrix $O_k$ is the largest.

11. A method performed in a transmitter side of a multiuser minimum square error linear precoding MIMO system that comprises a transmitter with a plurality of transmit antennae and a plurality of receivers, each receiver of the plurality of receivers comprising a plurality of receive antennae, the method comprising:
  obtaining, for some or all of the plurality of receivers, receiver channel information quantifying properties of transmit channels between the plurality of receive antennae of the respective receiver and the plurality of transmit antennae of the transmitter;
  establishing in the transmitter an order for determining receiver combining vectors of the some or all of the receivers by selecting as a next receiver in the order the so far unselected receiver that minimally increases mean square data transmission error, based on the receiver channel information of any receivers previously selected in the order and of unselected receivers; and
  providing a codebook of possible receiver combining vectors and selecting from among a plurality of possible combinations of receivers with receiver combining vectors from the codebook the combination of receivers that increases the mean square data transmission error the least;
  wherein the codebook is a codebook matrix C and wherein, for each receiver k of a set $\Delta$ of unselected receivers, the codebook C is multiplied with a channel matrix $H_k$ comprising said receiver channel information to form a matrix $\overline{H}_k=CH_k$, the method further comprising:
  determining the index k of the n-th receiver in the order and the row index j within the matrix $\overline{H}_k$ for which:

$$\arg\max_{k\in\Delta, j=1,\ldots,R} \frac{\overline{H}_k(j,:)A_n^{-2}\overline{H}_k(j,:)^H}{1+\overline{H}_k(j,:)A_n^{-1}\overline{H}_k(j,:)^H}$$

wherein R is the number of receiver combining vectors in the codebook matrix C and wherein H denotes a matrix transpose conjugate operation, wherein the matrix $A_n^{-1}$ for the selection of the n-th receiver is:

$$A_n^{-1}=A_{n-1}^{-1}-g_{n-1}^H(1+g_{n-1}\hat{h}_{\overline{k}_{n-1}}^H)^{-1}g_{n-1}$$

wherein $g_{n-1}=h_{\overline{k}_{n-1}}A_{n-1}^{-1}$ and $h_{\overline{k}_{n-1}}=\overline{H}_{\overline{k}_{n-1}}(\overline{j_{n-1}},:)$, wherein $\overline{H}_{\overline{k}_{n-1}}$ is the matrix $\overline{H}_{\overline{k}}$ of the (n-1)-th receiver immediately preceding the n-th receiver in the order and $j_{n-1}$ the selected row index within this matrix $\overline{H}_{\overline{k}_{n-1}}$.

12. A method according to claim 11, wherein a possible receiver combining vector in a codebook for a receiver is a left singular vector corresponding to a dominant singular value determined by a singular value decomposition of a channel matrix comprising the respective receiver's channel information.

13. A method performed in a transmitter side of a multiuser minimum square error linear precoding MIMO system that comprises a transmitter with a plurality of transmit antennae and a plurality of receivers, each receiver of the plurality of receivers comprising a plurality of receive antennae, the method being a method of scheduling receivers from among the plurality of receivers, the method comprising:
  obtaining, for some or all of the plurality of receivers, receiver channel information quantifying properties of transmit channels between the plurality of receive antennae of the respective receiver and the plurality of transmit antennae of the transmitter;
  establishing an order for determining receiver combining vectors of the some or all of the plurality of receivers by selecting as a next receiver in the order the so far unselected receiver from the some or all of the plurality of receivers that minimally increases a mean square data transmission error, based on the receiver channel information of any receivers previously selected in the order and of unselected receivers;
  determining receive combining vectors for the receivers in the order so as to minimize the mean square error of previously selected receivers, said determining based on the receiver channel information and taking into account receivers for which receive combining vectors have already been determined,
  wherein a number of receivers are placed in the order before receiver combining vectors that are to be used in the number of receivers are determined, and wherein prior to determining the order, determining for each receiver a preliminary receiving combining vector $c_{kp}$ that fulfills $$c_{kp}=\max_{|\hat{c}_k|=1}\|\hat{c}_kH_k\|^2,$$

wherein $\hat{c}_k$ corresponds to a plurality of possible receiver combining vectors and $H_k$ comprising said receiver channel information associated with the respective receiver; and
  transmitting data from the transmitter to the plurality of receivers and combining data signals received by the plurality of receive antennae of a respective receiver using the respective receiver combining vector of the receiver.

14. An apparatus for scheduling receivers from among a plurality of receivers in a multiuser minimum mean square error linear precoding MIMO system that comprises a transmitter with a plurality of transmit antennae, wherein each receiver of the plurality of receivers comprises a plurality of receive antennae, the apparatus comprising:
  a channel estimator configured to obtain, for some or all of the plurality of receivers, receiver channel information quantifying properties of transmit channels between the plurality of receive antennae of the respective receiver and the plurality of transmit antennae of the transmitter; and
  a scheduler configured to establish an order for determining receiver combining vectors of the some or all of the plurality of receivers by selecting as a next receiver in the order the so far unselected receiver from the some or all of the plurality of receivers that minimally increases a mean square data transmission error, based on the receiver channel information;

wherein a number of receivers are placed in the order before receiver combining vectors that are to be used in the number of receivers are determined, and wherein prior to determining the order, determining for each receiver a preliminary receiver combining vector $c_{kp}$ that fulfills $$c_{kp} = \max_{|\hat{c}_k|=1} \|\hat{c}_k H_k\|^2,$$

wherein $\hat{c}_k$ corresponds to a plurality of possible receiver combining vectors and $H_k$ comprising said receiver channel information associated with the respective receiver.

15. A multiuser minimum square error linear precoding MIMO system comprising an apparatus for scheduling receivers from among a plurality of receivers in the MIMO system, the MIMO system further comprising a transmitter with a plurality of transmit antennae, wherein each receiver of the plurality of receivers comprises a plurality of receive antennae, the apparatus comprising:
- a channel estimator configured to obtain, for some or all of the plurality of receivers, receiver channel information quantifying properties of transmit channels between the plurality of receive antennae of the respective receiver and the plurality of transmit antennae of the transmitter;
- a scheduler configured to establish an order for determining receiver combining vectors of the some or all of the plurality of receivers by selecting as a next receiver in the order the so far unselected receiver from the some or all of the plurality of receivers that minimally increases a mean square data transmission error, based on the receiver channel information;
- a processor configured to determine receive combining vectors for the some or all of the plurality of receivers in the order in a manner that minimizes the mean square data transmission error of previously selected receivers, the processor configured to base making the determination on the channel information and taking into account receivers for which receiver combining vectors have already been determined, wherein a number of receivers are placed in the order before receiver combining vectors that are to be used in the number of receivers are determined, and wherein prior to determining the order, determining for each receiver a preliminary receiver combining vector $c_{kp}$ that fulfills $$c_{kp} = \max_{|\hat{c}_k|=1} \|\hat{c}_k H_k\|^2,$$

wherein $\hat{c}_k$ corresponds to a plurality of possible receiver combining vectors and $H_k$ comprising said receiver channel information associated with the respective receiver; and
- a transmitter for transmitting data from the transmitter to the receivers;
- the receivers individually comprising combiners configured to combine data signals received by the plurality of receive antennae of a respective receiver using the respective receiver combining vector determined by the processor.

* * * * *